United States Patent [19]

Stone

[11] Patent Number: 4,522,145
[45] Date of Patent: Jun. 11, 1985

[54] CONVERTIBLE BOAT AND LUGGAGE CARRIER

[76] Inventor: Selden A. Stone, 113A N. Lake Dr., Leesburg, Fla. 32788

[21] Appl. No.: 553,589

[22] Filed: Nov. 21, 1983

[51] Int. Cl.³ .............................................. B63B 7/04
[52] U.S. Cl. .................................... 114/352; 224/309
[58] Field of Search ...................... 114/352, 353, 343; 296/157; 224/309

[56] References Cited

U.S. PATENT DOCUMENTS

| | | | |
|---|---|---|---|
| 2,292,972 | 8/1942 | Rice | 114/352 |
| 2,422,930 | 6/1947 | Rutledge | 114/353 |
| 2,570,528 | 10/1951 | Davis | 114/353 X |
| 2,659,464 | 11/1953 | Sweetman | 114/353 X |
| 3,634,897 | 1/1972 | Cuccio | 114/343 |

*Primary Examiner*—Sherman D. Basinger
*Attorney, Agent, or Firm*—Arthur G. Yeager

[57] ABSTRACT

A sectional boat, which also serves as a luggage carrier on an automobile roof or trailer, which comprises a bow section and a stern section which nest together when the two sections are placed with their open sides in a face-to-face relationship, and a waterproof sealing strip between adjacent surfaces of the nesting sections to make a water-tight luggage carrier; the two boat sections being assembleable into a boat by clamping together two boat sections, with a clamping T-shaped seat.

10 Claims, 11 Drawing Figures

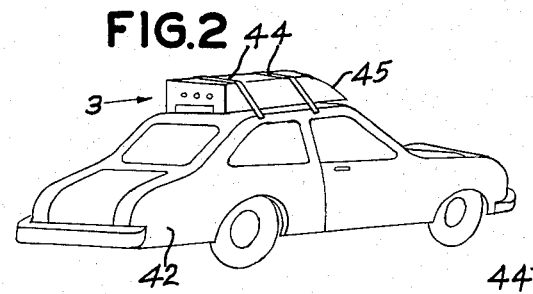
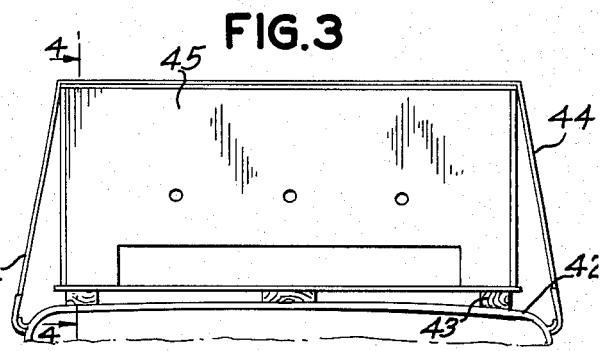
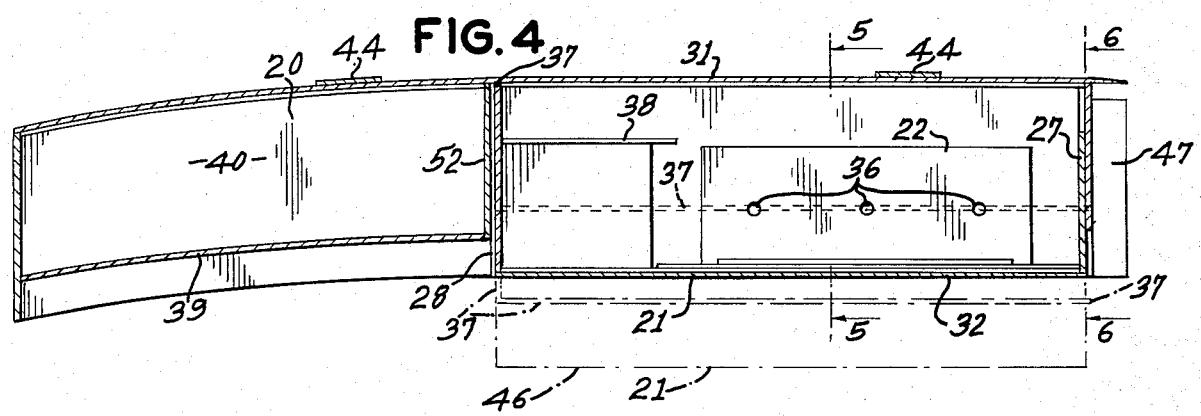
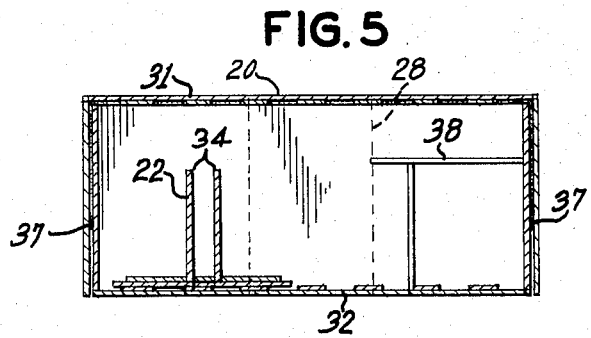
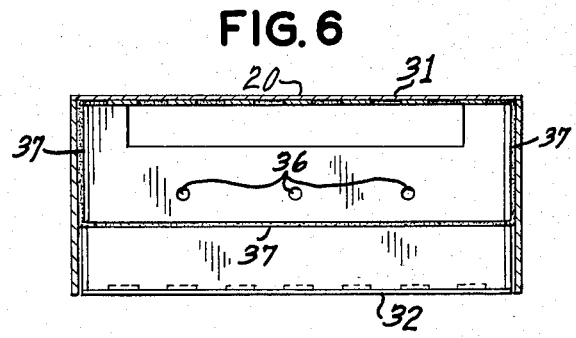
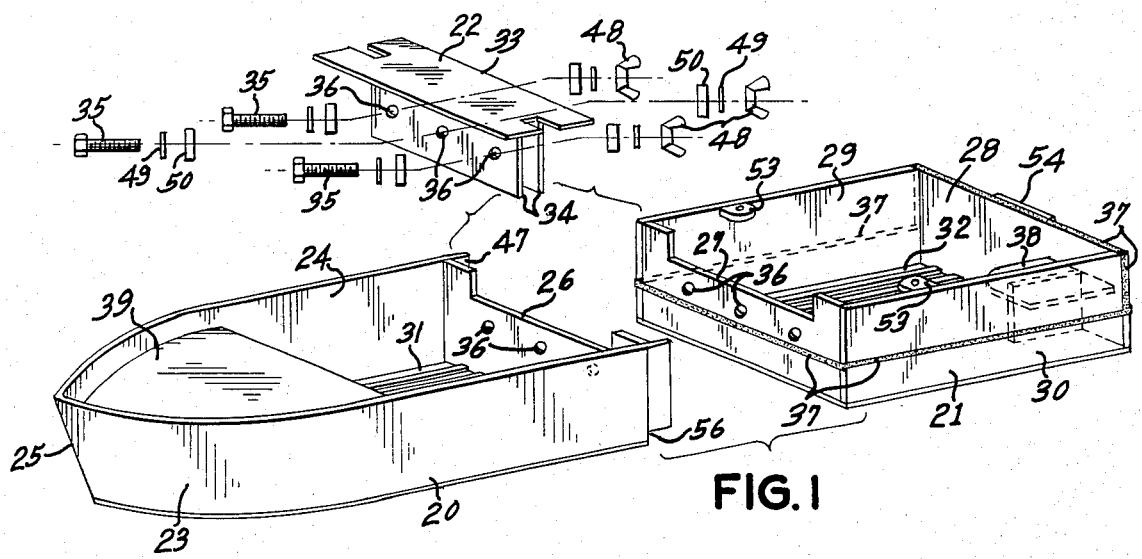

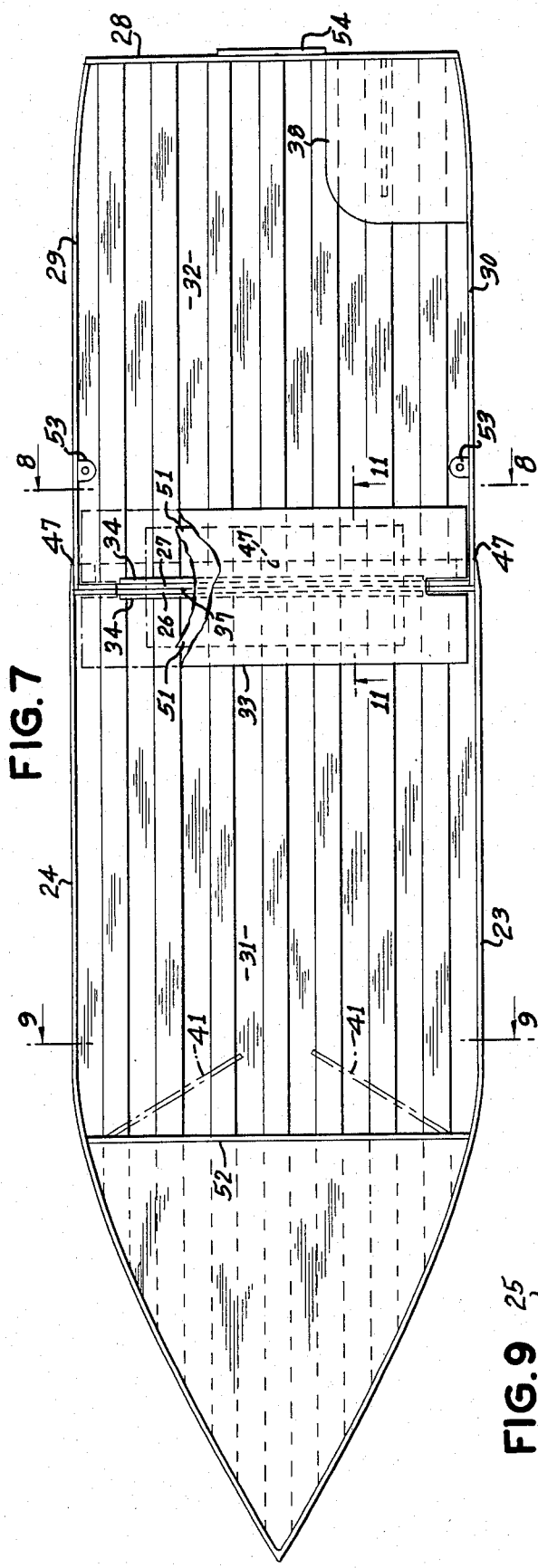

CONVERTIBLE BOAT AND LUGGAGE CARRIER

BACKGROUND OF THE INVENTION

Boats have for many years been available in a sectional construction whereby a boat, for example, 10–20 feet in length, can be disassembled into two or more sections for transportation across land. See, for example, U.S. Pat. No. 1,258,745 to Clark, U.S. Pat. No. 2,650,376 to Sommer and U.S. Pat. No. 2,977,607 to Roblee. Some of these boats are designed so that the disassembled sections nest within each other to provide greater facility in handling. Other sectional boats have been designed to be capable of assembly not only into a boat but also into a trunk or other luggage such as a carrier to be mounted on a trailer or on the roof of an automobile. See, for example, U.S. Pat. No. 67,342 to Olmstead; U.S. Pat. No. 119,348 to Groel; U.S. Pat. No. 2,422,930 to Rutledge; and U.S. Pat. No. 2,659,464 to Sweetman. While it is highly desirable and efficient to have a dual purpose device such as disclosed in the above prior art patents, they are not as well designed as possible. One of the principal deficiencies is that the normal design of a luggage carrier requires two identical half sections which can close on each other so as to be water tight, and such a design is not preferred when assembled into a boat.

It is an object of this invention to provide a sectional boat that has an acceptable design for handling in the water and also can serve as a waterproof luggage carrier. Other objects will appear from the more detailed description of this invention found below.

BRIEF DESCRIPTION OF THE INVENTION

This invention is directed to a convertible boat and luggage carrier of two mating boat sections; one section being the bow section of the boat having an open top and two side walls converging to form the bow, a bottom, and a middle transverse wall and the other section being the stern section having an open top, two side walls, a transom and an aft transverse wall, the two sections being adapted to form an enclosed luggage carrier when their open tops are joined in face-to-face relationship; the improvement which comprises said stern section adapted to nest inside said bow section when their open tops face each other and the transom is adjacent the bow, a three-sided socket formed by the combination of the two side walls and the bottom of the bow section extending aft of the middle transverse wall and adapted to mate with the forward portion of the stern section, and a transverse seat member comprising a horizontal seat and two parallel spaced clamping members depending vertically downward from the underneath side of the seat adapted to clamp the middle transverse wall to the aft transverse wall in abutting relationship to form a boat.

In a specific embodiment of this invention a waterproof sealing strip is applied around the outside of the stern section to fit snugly against the inside of the bow section when the two sections are nested to form a luggage carrier.

BRIEF DESCRIPTION OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is an exploded view in perspective of the boat of this invention;

FIG. 2 is a schematic illustration of an automobile with the sectional boat of this invention assembled as a luggage carrier on the automobile roof;

FIG. 3 is an enlarged partial view taken from the rear showing the attachment of the luggage carrier to the automobile in FIG. 2;

FIG. 4 is a cross-sectional view taken at 4—4 of FIG. 3;

FIG. 5 is a cross-sectional view taken at 5—5 of FIG. 4;

FIG. 6 is a cross-sectional view taken at 6—6 of FIG. 4;

FIG. 7 is a top plan view of the assembled boat of this invention;

FIG. 8 is a cross-sectional view taken at 8—8 of FIG. 7;

FIG. 9 is a cross-sectional view taken at 9—9 of FIG. 7;

FIG. 10 is a perspective view of the aft end of the bow section of the boat of this invention; and FIG. 11 is a cross-sectional view taken at 11—11 of FIG. 7.

DETAILED DESCRIPTION OF THE INVENTION

In FIG. 1 there is shown in an exploded view the general construction features of the sectional boat of this invention. The component parts of the boat are shown in detail in FIGS. 7–11. The boat comprises three components: bow section 20, stern section 21, and transverse clamping T-shaped seat member 22 which are held together by any convenient fastening means, such as bolt holes 36, bolts 35, and nuts 48, with suitable washers 49 and rubber seals 50.

Bow section 20 is triangular shaped and includes side walls 23 and 24, which meet at the forward end in bow 25, middle transverse wall or bulkhead 26, and bottom 31.

Stern section 21 is rectangular shaped and includes side walls 29 and 30, transom 28, aft transverse wall or bulkhead 27, bottom 32, operator's seat 38, oar locks 53, and waterproof stripping 37.

Transverse clamping seat member 22 includes a horizontal seat 33 and two spaced, parallel, vertical clamping plates 34 depending from the underneath side of seat 33. The spacing between plates 34 is slightly greater than the sum of the thicknesses of walls 26 and 27. Waterproof stripping 37 is preferably included between walls 26 and 27 when they are clamped together between plates 34, so as to provide a waterproof barrier to prevent water from rising between plates 34 and getting inside of bow section 20 or stern section 21. Aligned bolt holes are shown through plates 34 and walls 26 and 27 to permit bolts 35 and nuts 48 to be tightened so as to join bow section 20 to stern section 21 to produce a rigid boat structure. If waterproof insulation 37 is employed, it should be placed below holes 36 as shown in FIG. 1, and as an added waterproofing feature, rubber seals 50 are used in conjunction with bolts 35 and nuts 48.

The sectional boat of this invention is designed to be assembled, not only into a boat as described above, but also as a luggage carrier for an automobile. In FIGS. 2-6 this embodiment may best be seen. In FIG. 2 it is shown how the disassembled sectional boat 45 is placed on top of automobile 42 and held in place by suitable straps 44 which may be attached to the car in any convenient fashion, e.g. at the drip rail or at the windows. Preferably there would also be a luggage rack 43 which would rest on the curved automobile roof and provide a suitable upper surface on which the collapsed boat 45 would be held in place by straps 44.

The collapsed boat assembly for use as a luggage carrier is prepared by placing stern section 21 in its upright position with the open side facing upwardly. Bow section 20 is turned upside down and placed over stern section 21 as shown in FIGS. 4-6. Position 46 in FIG. 4 shows how stern section 21 appears when bow section 20 is only partially lowered into place. In this instance the forward portion of bow section 20 is provided with a deck 39 and a forward transverse wall or bulkhead 52, which may, if preferred, by provided with doors 41, and which produces an enclosed space 40 in the bow of the boat, and leaves a generally rectangular open space between walls 26 and 52. This open space is designed to be substantially identical to the space occupied by stern section 21 and its waterproof stripping 37 which encircles stern section 21. If the dimensions of these cooperating components are controlled properly stern section 21 will fit snugly into the open space between walls 26 and 52 and also between side walls 23 and 24 and prevent moisture from getting inside of luggage carrier 45. When luggage carrier is placed with bow 25 facing the front of automobile 42 there will be the added feature of streamlining to reduce air drag by the luggage carrier. It can be seen in FIG. 5 that the disassembled seat member 22 easily fits within stern section 21 of luggage carrier 45, leaving plenty of space for carrying any other luggage, life preservers, boat gear, etc. These items may also be stored in compartment 40 in the bow section of the boat.

Waterproof stripping 37 is affixed to the outside surfaces of stern section 21 so as to prevent water from getting inside of section 21 when the boat is collapsed for use as a luggage carrier. As seen best in FIG. 1, stripping extends lengthwise of side walls 29 and 30 and also of aft transverse wall 27. Since transom 28 has a stepped surface because of motor mounting plate 54, stripping 37 does not extend across the face of transom 28. Instead, stripping 37 runs vertically at the aft end of walls 29 and 30 to the top edge of transom 28 and extends across the top edge of transom 38 from wall 29 to wall 30, as best seen in FIGS. 1 and 4.

The bolt means for clamping walls 26 and 27 between seat clamping plates 34 may comprise whatever combination of bolt sizes desired. At least two bolts are necessary for secure clamping, and more than two may be preferred, with three being shown here. The bolt size is not critical so long as they are large enough to withstand the stresses produced in maneuvering a boat on rough water. It is preferred that $\frac{1}{2}$-$\frac{3}{4}$ inch bolts be employed with metal washers 49 and rubber sealing washers or grommets 50 used on both ends of the bolt shank in order to provide good clamping and waterproofing. Preferably, bolts, nuts, metal washers, etc. should be made of stainless steel, brass or other metal alloys which are not corroded by water.

The aft end of bow section 20 is formed into a three-sided socket 47 by the extension of side walls 23 and 24 and bottom 31 beyond middle transverse wall 26. These extensions 55 are tapered inwardly from the outside surfaces of bow section 20 at wall 26 to the outside surfaces of aft section 21. In effect, these extensions form tapered fins 55 which provide a streamlining design which functions to minimize the water drag at this location. The tapered fin extensions can be seen in FIGS. 1, 7, 10 and 11. A preferred design is to cut notches 56 in the corners formed by side walls 23 and 24 with bottom 31. These open notches provide some facility in assembling bow section 20 to aft section 21. The principal purpose of the tapered fins 55, however, is to reduce the water drag on the boat.

Bottoms 31 and 32 of bow section 20 and stern section 21, respectively, are shown with longitudinal slats 57. It is to be understood that the outside of the bottoms 31 and 32 may be smoothly convexly rounded or may have an angular surface with a keel along the longitudinal centerline of the boat or may be fashioned in accordance with other boat designs. An alternative feature is for the inside of bottoms 31 and 32 to be smooth and flat. It is preferred that bottoms 31 and 32 be integrally formed with a corrugation shape or be covered with a flooring of spaced slats. This feature is frequently employed in boats to provide better footing and some safeguard against slippage on a flat, wet surface.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a combination boat and luggage carrier of two mating boat sections, one section being the bow section of the boat having an open top, two side walls converging to form the bow, a bottom, and a middle transverse wall, and the other section being the stern section having an open top, two side walls, a transom, and an aft transverse wall, said two sections forming an enclosed luggage carrier when their open tops are joined in face-to-face relationship; the improvement, which comprises said stern section being dimensioned to be nested substantially within said bow section when said open tops face each other and said transom is adjacent said bow and said bow section bottom is spaced above said stern section and the free edge of said stern section stern side walls being closely adjacent said bow section bottom, a three-sided socket formed by said side walls and said bottom of said bow section extending aft of said middle transverse wall and mating with said forward portion of said stern section when said bow and stern sections are aligned, and a transverse seat member including a horizontal seat and two spaced clamping members depending vertically downward from the underneath side of said seat, means connected to each of said clamping members and passing through said middle transverse wall and said aft transverse wall to form a watertight connection between said sections to form a boat.

2. The combination of claim 1 wherein said clamping members are two spaced flat parallel plates with holes therethrough aligned with holes in said transverse walls, said means connected to each of said clamping members includes at least a pair of threaded bolts passing through said plates and said transverse walls and a pair of nuts threaded thereon.

3. The combination of claim 2 wherein said means connected to each of said clamping members includes means for sealing said bolts and inhibiting water from entering therearound into said boat.

4. The combination of claim 1 wherein said stern section includes a sealing strip around the outside walls thereof and providing a substantially waterproof seal between the outside of said stern section and the inside of said bow section when the two sections are nested to form a luggage carrier.

5. The combination of claim 1 wherein the stern section is substantially rectangular, and the bow section contains an enclosed portion at the bow and a substantially rectangular open section aft of the enclosed portion which nestingly receives therein said substantially rectangular stern section.

6. The combination of claim 1 further comprising means for mounting said boat and luggage carrier on the top of a vehicle with said bow section positioned toward the front of the vehicle and said bottom of said bow section being spaced above said bottom of said stern section.

7. A sectional boat separable in its midsection comprising a bow section and a stern section which are generally aligned and abut each other when assembled to produce a boat, said bow section havng two side panels which converge at the bow, a middle transverse bulkhead at the opposite end from said bow, and a bottom, a triangularly shaped deck portion adjacent said bow and a forward transverse bulkhead substantially parallel to the middle transverse bulkhead between said deck portion and said bottom of said bow section; said stern section having two side panels, a transom, a rear transverse bulkhead, and a bottom; a T-shaped seat clamp having a horizontal seat member and two parallel vertical clamping plates depending from the underneath side of said seat member; each of said clamping plates, middle transverse bulkhead and rear transverse bulkhead having at least two spaced openings aligned to form a pair of bolt passageways; and a pair of bolt assemblies passing through respective said bolt passageways to rigidly clamp together said middle and rear transverse bulkheads; said stern section being dimensioned to be substantially nested in said bow section when said bow section is placed upside down with said forward transverse bulkhead adjacent said transom when assembled as a luggage carrier; said middle bulkhead being positioned slightly forward of the rear extremities of said side panels and said bottom of said bow section, and the forward portion of the stern section being nested within said rear extremities of said bow section when assembled as a boat.

8. The boat of claim 7 wherein said two clamping plates are spaced apart so as to fit snugly over the outside of said middle and rear transverse bulkheads when abutted against each other.

9. The boat of claim 7 which additionally comprises a waterproof sealing strip around the outside of said stern section so as to contact the inside surfaces of said bow section when the stern section is nested within said bow section.

10. The boat of claim 7 wherein said two side panels and said bottom of said bow section extend aft of the middle transverse bulkhead and are tapered to form a streamlined juntion with said stern section fitting inside of said panels and bottom to reduce water drag on said boat.

* * * * *